Oct. 30, 1951 A. C. WILCOX 2,573,237
INTERCHANGEABLE GLASS AND METAL VACUUM COFFEE MAKER
Filed Aug. 30, 1949 4 Sheets-Sheet 2

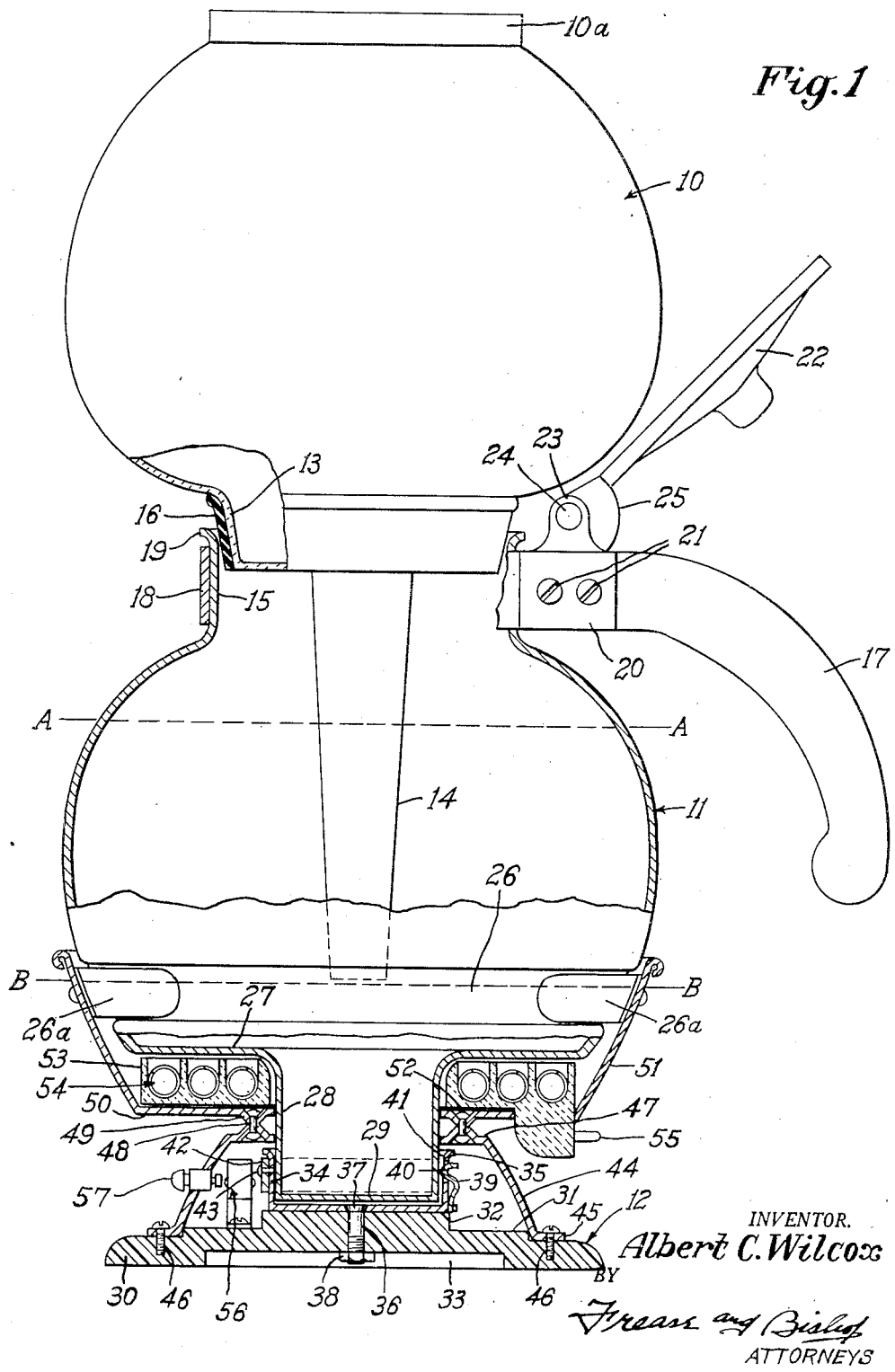

INVENTOR.
Albert C. Wilcox
BY
Frease and Bishop
ATTORNEYS

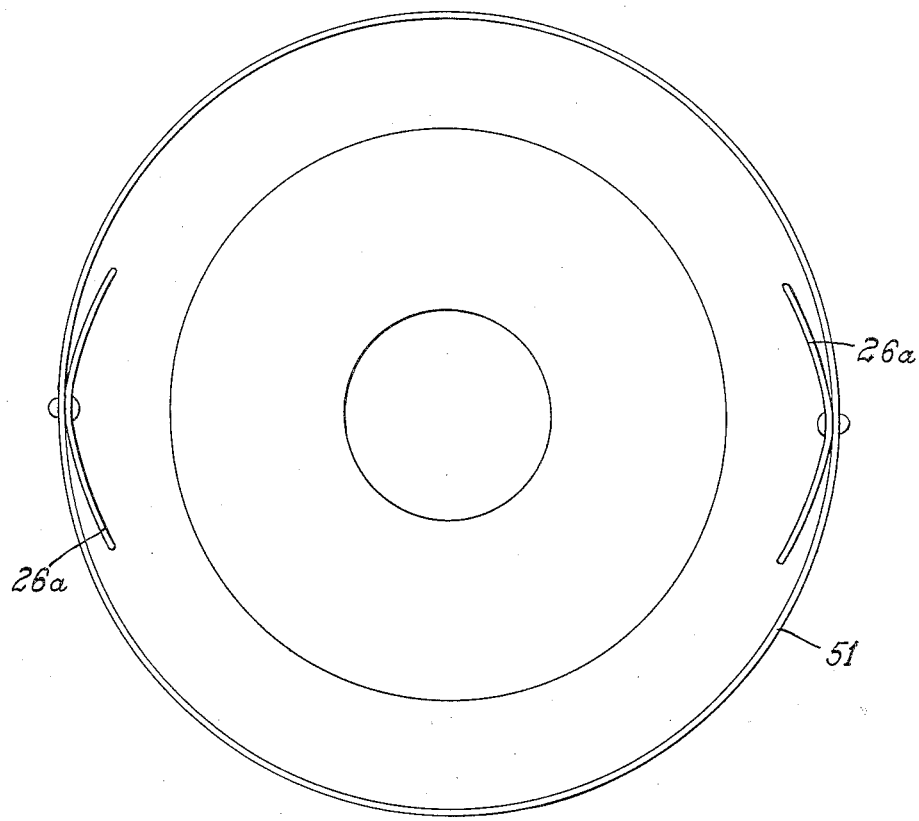
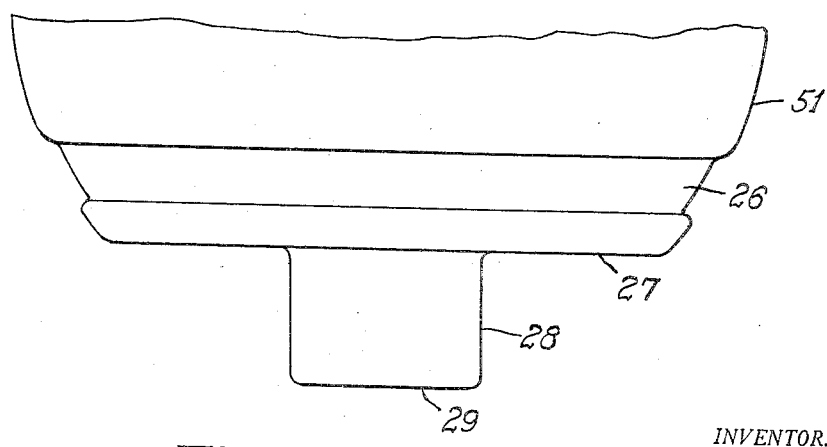

INVENTOR.
Albert C. Wilcox
BY
Frease and Bishop
ATTORNEYS

Patented Oct. 30, 1951

2,573,237

UNITED STATES PATENT OFFICE 2,573,237

INTERCHANGEABLE GLASS AND METAL VACUUM COFFEE MAKER

Albert C. Wilcox, Chicago, Ill.

Application August 30, 1949, Serial No. 113,202

3 Claims. (Cl. 219—43)

The invention relates to vacuum coffee makers, and has for an object to simplify such coffee makers whereby the manufacturing cost may be lower, so as to sell to the trade at a very low popular price for automatic electric coffee makers.

Another object is to provide such a vacuum coffee maker whereby the housewife has the option of obtaining a full automatic electric vacuum coffee maker in either glass or metal.

A further object is to provide such a vacuum coffee maker in which the lower water container is quickly and easily detachable from the heating means, whereby it may be thoroughly washed.

A still further object is to provide such a vacuum coffee maker in which the heating means is located in a separable base having spring clips therein for snapping the lower water container into or out of the base.

Another object provides such a construction in which the base containing the heating means can remain attached to the lower container after brewing and when serving the coffee, so that the coffee beverage in the lower container may be kept hot until used.

A further object is to provide such a vacuum coffee maker in which the base is provided with a metal shell to receive a reduced well at the bottom of the lower water container, said shell having a curved bi-metal strip connected to its outer side for operating a switch for controlling the heating circuit.

The above objects together with others which will be apparent from the drawings and following description, or which may be later referred to, may be attained by constructing the improved vacuum coffee maker in the manner hereinafter described in detail and illustrated in the accompanying drawings, in which—

Figure 5:
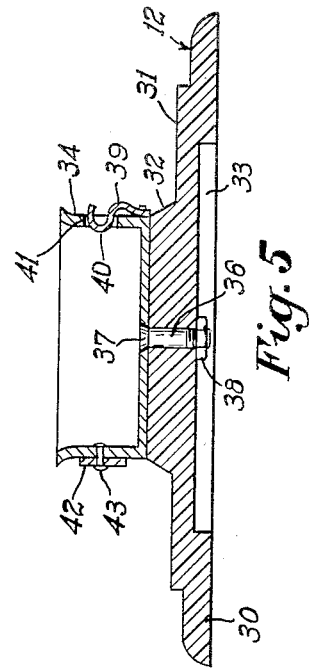
Figure 2:
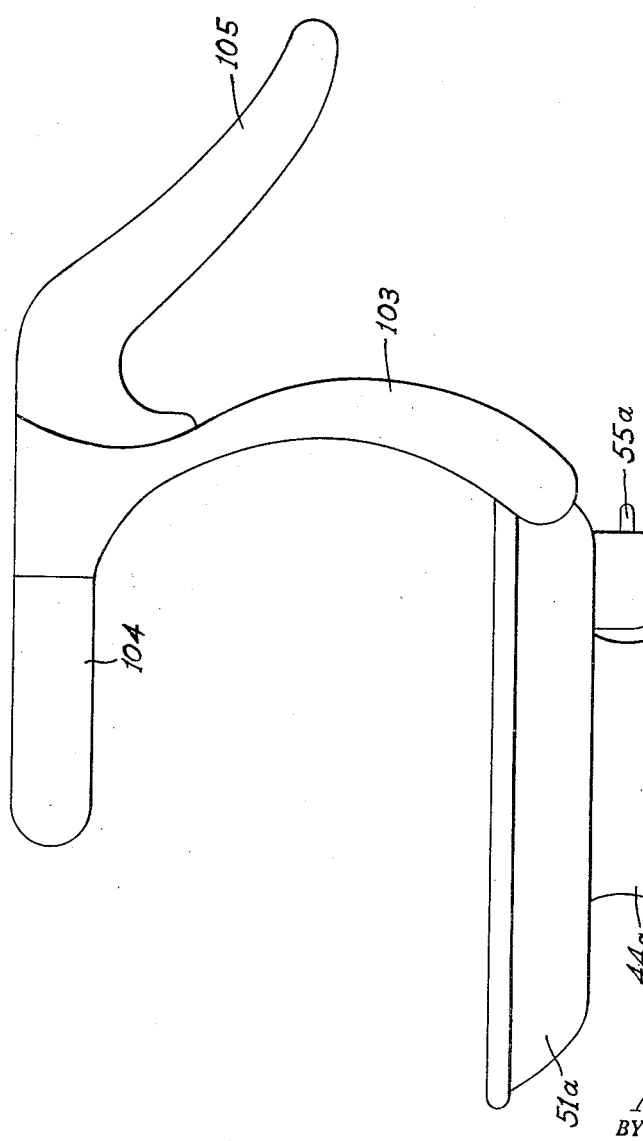
Figure 6:
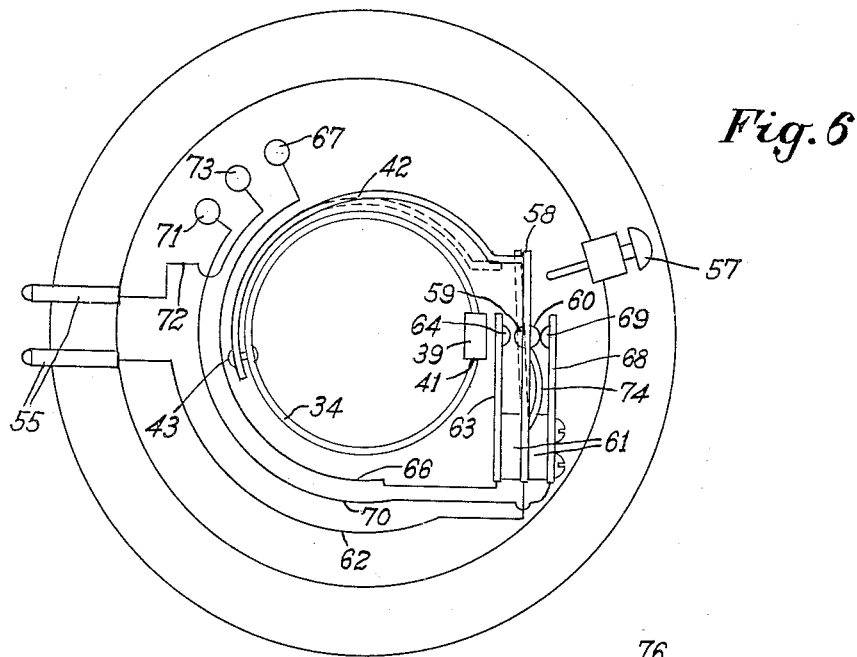
Figure 7:
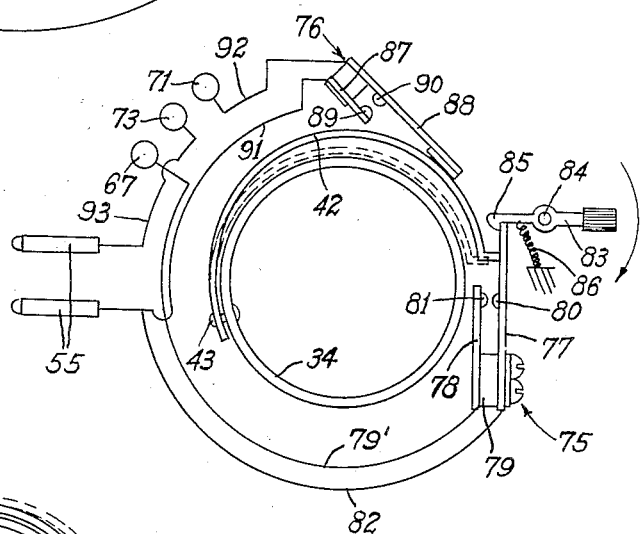
Figure 8:
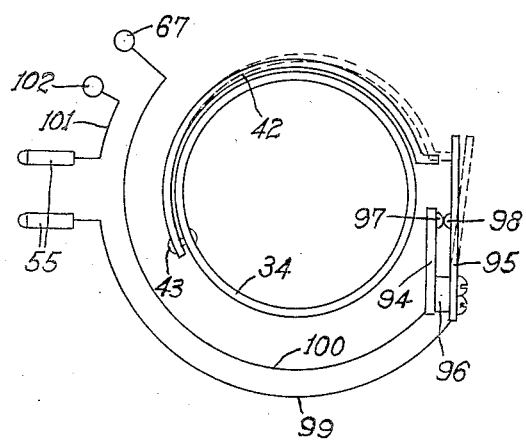

Figure 1 is a longitudinal, vertical sectional view through a vacuum coffee maker embodying the invention;

Fig. 2, a side elevation of a modified form of metal shell for receiving the lower water container of the vacuum coffee maker, and adapted to enclose the electric heating means and circuit therefor;

Fig. 3, a fragmentary, side elevation of the lower portion of the lower water container, showing the groove which accommodates the spring clips for holding the lower water container rigidly in the metal shell;

Fig. 4, a top plan view of the base, showing the spring clips in the cup shape metal shell which engage the groove in the lower water container for detachably connecting it to the base;

Fig. 5, a detached, vertical, sectional view through the plastic base and the metal entering shell thereon which carries the bi-metal strip and which receives the water well of the lower water container;

Fig. 6, a diagrammatic view of the circuit for operating the heating means, showing the parts in position with the low heat circuit closed immediately after the high heat circuit has been opened by action of the bi-metal strip;

Fig. 7, a similar view of a modified form of wiring, showing the low heat circuit open at the same time that the high heat circuit is being snapped off by the action of the bi-metal strip; and Fig. 8, a diagram of a further modification of wiring for only a high heat unit, showing the circuit in normal closed position in full lines, and in open position in broken lines.

Referring first more particularly to the construction illustrated in Figs. 1, 3, 4 and 5, the improved vacuum coffee maker to which the information pertains, includes generally the upper container 10, formed of glass, the lower container 11 which may be formed of either metal or glass as desired, and the base indicated generally at 12.

The upper container 10 is of generally spherical shape, having the reduced, slightly tapered lower portion 13 terminating in the depending siphon tube 14, and may be provided at its upper end with a tight fitting cover 10a.

The lower container 11, which may be formed of either glass or metal as desired, may be of generally spherical shape provided at its upper, open end with the cylindrical neck 15 to receive the tapered lower portion 13 of the upper container, a rubber sealing ring 16 being located around the tapered portion 13 of the upper container so as to form an air and liquid-tight seal between the two containers at this point.

The lower container 11 may be provided with a handle 17, formed of any suitable material, preferably a plastic material such as Bakelite. This handle may be attached to the neck portion 15 of the lower container by means of a metal band 18 which is clamped around the neck 15, below the bead 19 at the upper end thereof, the ends of this band, as indicated at 20, being attached to the handle as by screws 21 or their equivalents.

A lid or cover 22, which may be formed of metal, plastic or other suitable material, is hingedly connected to the ears 23 upon the upper end of the handle, as by means of the hinge pin 24, a limit stop lug 25 being preferably formed upon the lid for contact with the top of the handle to limit the opening movement of the lid to the position shown in Fig. 1. This lid or cover is designed to fit upon the open, upper end of the neck 15 of the lower container when serving the brewed coffee beverage therefrom after the upper container has been removed.

The lower container 11 is provided with a peripheral groove 26, near its lower end for engagement with the spring clips 26a in the shell 51, and has the flat bottom wall 27 terminating centrally in the depending, cylindrical well 28, having the closed flat bottom 29.

The base unit, indicated generally at 12, comprises the base member 30, which may be formed of plastic material such as Bakelite, of substantially disk shape with the circular shouldered portions 31 and 32 formed concentrically upon its upper side and the recess 33 in its lower side.

A cup shape metal shell 34 with flared upper end 35 is mounted upon the central shouldered portion 32 of the base member, as by the binding screw 36, having a countersunk head 37 located in a suitable aperture in the bottom wall of the shell 34, the screw being located through a central aperture in the base member 30 and provided with a nut 38, located within the recess 33 in the bottom of the base member.

A tension spring 39 is connected to the exterior of the cup shaped shell 34, the free end thereof being curved as at 40 and located through an aperture 41 in the side wall of the shell 34 for frictional contact with the well 28 of the lower container 11 as shown in Fig. 1 to hold the well 28 in contact with the other side of the shell 34.

A curved bi-metal strip 42 is connected at one end to the exterior of the shell 34 as indicated at 43 in Fig 6, and normally lies close to the exterior of said shell as shown in broken lines in said figure.

Thus, by means of the spring clip 39 the well 28 is held in contact with the shell 34 at the point of connection of the bi-metal strip 42, so that when the water in the well heats to the proper temperature the heat will be rapidly conveyed to the bi-metal strip. By loosening the nut 38 the shell 34 may be rotated clockwise or counterclockwise as desired, for the purpose of adjusting the position of the bi-metal strip relative to the switch in order to adjust the timing.

A metal shell 44, in the shape of a truncated cone, is provided at its lower end with a peripheral flange 45 seating upon the top of the plastic base member 30, surrounding the shoulder portion 31 thereof, and is attached thereto as by the screws 46.

The upper end of the shell 44 has the inturned, annular flange 47, with V-shaped projections 48 formed therein, for attachment to the similar projections 49 upon the flat bottom flange 50 of the shell 51, which is cup-shaped to receive the lower portion of the lower container 11. The shells 44 and 51 are rigidly connected together by means of rivets 52, located through the projections 48 and 49 respectively in the two shells. This construction baffles heat radiation to the lower portion of the base to prevent premature operation of the switch.

A refractory block 53 is located within the lower portion of the shell 51, for mounting electric heating unit means, indicated generally at 54 in Fig. 1 in such position that it will be directly adjacent to the bottom of the lower container 11 as shown in Fig. 1. This heating unit may be the conventional open type heating coil ordinarily used for such purposes.

The refractory block carries terminal points 55 for supplying current to the heating unit through a circuit to be later described, in which is located a switch indicated generally at 56 in Fig. 1 and adapted to be initially operated by a momentary thumbing button 57, and to be automatically operated by the bi-metal strip 42 as will be later described in detail.

Referring now to Figure 6, a diagram of the circuit for the electric heating unit is shown. The switch in this diagram comprises a central blade 58, having contact points 59 and 60 on opposite sides thereof, at a point spaced from the fixed end of the blade, which is mounted between insulation blocks 61. This blade is connected by a wire 62 to one terminal point 55. A blade 63, for controlling the high heat unit, is fixed to one of the insulation blocks 61 and has a contact point 64 thereon for contact with the point 59 upon the central blade 58, the blade 63 being connected by wire 66 with one end of the high heat unit, as indicated at 67 in Fig. 6.

A similar blade 68 is connected to the other insulation block 61 and provided with a contact point 69 for engagement with the contact point 60 of the central blade, for controlling the low heat unit, and this blade is connected by a wire 70 with one end of the low heat unit as indicated at 71. The other terminal point 55 is connected by a wire 72 to a feed line, as indicated at 73, which is connected to the opposite ends of the high heat unit and low heat unit. A spring clip is diagrammatically indicated at 74 for holding the points 60 and 69 in contact at one step of the operation as will be later described.

In Fig. 7 is shown a modified form of wiring, in which the high heat unit is controlled by a switch mechanism indicated generally at 75 and the low heat unit is controlled by a switch mechanism indicated generally at 76. The switch 75 includes two spaced blades 77 and 78, each connected at one end to an insulation block 79, and provided with contact points 80 and 81 respectively adapted to make contact with each other when the flexible switch blade 77 is released and permitted to spring toward the blade 78. A wire 82 connects one terminal point 55 with the switch blade 77 and the blade 78 is connected by a wire 79' to one end of the high heat unit as indicated at 67. In this construction the momentary thumbing button is in the form of a lever 83, fulcrumed intermediate its ends as at 84 and having a projection 85 at its inner end normally engaged over the free end of the blade 77, by the action of the spring 86, so as to hold the contact points 80 and 81 separated.

The switch 76 comprises the short switch blade 87 and the longer switch blade 88, the free end of which contacts the curved bi-metal strip 42. Contact points 89 and 90 respectively are mounted upon the blades 87 and 88 for contact with each other. The blade 87 is connected by a wire 91 with the above mentioned terminal point and the blade 88 is connected by a wire 92 with one end of the low heat unit as indicated at 71. The other terminal point 55 is connected by a wire 93 with a feed line as indicated at 73 which connects to the opposite ends of the high heat unit and low heat unit.

In Fig. 8 is shown a more simplified wiring, in which the switch comprises the switch blades 94 and 95, each connected at one end to an insulation block 96, and provided with the contact points 97 and 98 respectively for engagement with each other. The blade 95 is connected by a wire 99 with one terminal point 55 and the blade 94 is connected by a wire 100 with one end of the high heat unit as indicated at 67. The other terminal point 55 is connected by a wire 101 with a feed line 102 for connection to the other end of the high heat unit. There is no low heat unit in this wiring arrangement.

In Fig. 2 is shown a modified form of base for the lower container, in which the shell 44a may be substantially like the shell 44 above described and may be mounted upon a plastic base member 30 and it attached at its upper end to the shell 51a, similar to the shell 51 in Fig. 1 and adapted to receive the lower portion of the lower container 11.

Heating means and switch means as above described may be located within the shells 44a and 51a, and the momentary thumbing button 57a may be provided therein, and terminal points 55a may be provided for the circuit within the shells 44a and 51a, all in the manner above described.

In this form of the invention a curved, upright 103 is rigidly connected to one side of the shell 51a and has at its upper end the curved spring clips 104 for engaging around the neck 15 of the lower container for holding it in the shell 51a, and a handle 105 of Bakelite or other plastic material is rigidly attached to the upright 103. A lid such as shown in Fig. 1 may be attached to the handle 105.

In the operation of the improved vacuum coffee maker illustrated and above described, the proper amount of water is placed in the lower container 11, the water level for the desired amount of coffee beverage being indicated at A—A. Then the upper container 10 is placed in position as shown in Fig. 1, the rubber ring 16 forming a tight seal between the two containers, and the required amount of ground coffee is placed in the upper container. A conventional electric cord and plug is attached to the terminal points 55 connecting the same to an electric circuit, and the momentary thumbing button 57 is pushed inward.

Assuming that the wiring within the base of the device is such as shown in Fig. 6, in which the contacts 60 and 69 are normally closed, the operation of the momentary thumbing button will move the blade 58 to the dotted line position in said figure, making contact at 59—54 and closing the circuit to the high heat unit, the blade 58 being designed to remain in this position until moved as will be later described.

The water in the lower container 11 will then start to heat, the heated water from the bottom of the container rising toward the top while cold water from above circulates downward. This circulation continues up to and including the boiling point, and for a certain length of time as the water rises in temperature, pressure is created on top of the water surface A—A and finally the water starts to rise gradually in the tube 14, mingling with the ground coffee and starting the brewing action.

As the water level lowers in the lower water container the boiling action becomes faster and more violent, causing a rapid succession of pressure escaping through the tube 14 which causes agitation or splashing above the water level in the upper container. As the water level in the lower container lowers to the bottom of the tube 14, the boiling action is very active and the heat is radiated down into the well 28, by bi-metal strip 42 becoming active and moving from the dotted line position to the full line position in Fig. 6, moving the blade 58 from the dotted line position to the full line position, breaking the circuit to the high heat unit and closing the circuit through 60—69 to the low heat unit, the parts being held in this position by snapping action of the spring clip 74, and current will continue to flow to the low heat unit to keep the coffee at drinking temperature.

If the wiring is such as shown in Fig. 7, it will be evident that in the normal position, as shown in dotted lines, the bi-metal strip 42 will lie adjacent to the shell 34, the contacts 89 and 90 closing the circuit to the low heat unit, while the contacts 80 and 81 will be held separated by the momentary thumbing button 83, so that the circuit to the high heat unit is open.

When the water and coffee have been placed in the lower and upper containers respectively, as above described, the terminal points 55 are connected to a live circuit and the momentary thumbing button is pushed in the direction of the arrow in Fig. 7, releasing the blade 77 and permitting it to make contact between 80 and 81, closing the circuit to the high heat unit.

When the bi-metal strip 42 reaches the temperature causing it to flex away from the shell 34, to the full line position shown in Fig. 7, moving the blade 88 outward and separating the contacts 89 and 90, breaking the circuit to the low heat unit at the same time that the blade 77 is moved outward by the end of the bi-metal strip, opening the circuit to the high heat unit. The momentary thumbing button engages the blade 77, holding it in this position. At this time the coffee has been brewed and all contacts remain broken until the coffee cools sufficiently to permit the bi-metal strip to return to normal position, permitting the contacts 89 and 90 to close the circuit to the low heat unit. When heated to the proper temperature the bi-metal strip will again flex, breaking the circuit, and thus cycle will continue.

The operation of the wiirng shown in Fig. 8 is quite simple. Only one heat unit is used in this arrangement and the switch contacts are normally closed. When a live circuit is plugged into the terminal points the water will start to heat and when the set temperature is reached the bi-metal strip will flex to the dotted line position breaking contact between 97 and 98. Then as the coffee cools the bi-metal strip will return to normal position permitting the circuit to close and thus cycle will continue.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful constructions, and reasonable mechanical equivalents thereof obvious to those skilled in the art, are set forth in the appended claims.

I claim:

1. A vacuum coffee maker comprising a lower container having an open upper end and a reduced depending well at its lower end, a base having a cup-shaped portion receiving the lower portion of the lower container, means for detachably connecting the base to the lower container, electric heating means in the base, a metal shell in the base for receiving said depending well of the lower container, an electric circuit for the heating means in the base, a switch in the circuit, a bi-metal strip connected at one end to one side of the metal shell for operating the switch, and a tension spring at the opposite side of the metal shell for pressing the depending well against the metal shell at the point of connection of the bi-metal strip.

2. A vacuum coffee maker comprising a lower container having an open upper end and a reduced depending well at its low end, a base having a cup-shaped portion receiving the lower portion of the lower container, means for detachably connecting the base to the lower container, electric heating means in the base, a metal shell in the base for receiving said depending well of the lower container, an electric circuit for the heating means in the base, a switch in the circuit, a bi-metal strip connected at one end to one side of the metal shell for operating the switch, and means for pressing the depending well against the metal shell at the point of connection of the bi-metal strip, and means for adjusting the metal shell clockwise or counterclockwise to adjust the timing.

3. A vacuum coffee maker comprising a lower container having an open upper end and a reduced depending well at its lower end, a base having a cup-shaped portion receiving the lower portion of the lower container, means for detachably connecting the base to the lower container, electric heating means in the base, a metal shell in the base for receiving said depending well of the lower container, an electric circuit for the heating means in the base, a switch in the circuit, a bi-metal strip connected at one end to one side of the metal shell for operating the switch, and a tension spring at the opposite side of the metal shell for pressing the depending well against the metal shell at the point of connection of the bi-metal strip, and means for adjusting the metal shell clockwise or counterclockwise to adjust the timing.

ALBERT C. WILCOX.

REFERENCES CITED

The following references are of record in the file of this patent:

UNITED STATES PATENTS

| Number | Name | Date |
|---|---|---|
| 681,982 | Savage | Sept. 3, 1901 |
| 1,916,369 | Harpster | July 4, 1933 |
| 1,978,074 | Bogoslowsky | Oct. 23, 1934 |
| 2,217,474 | Foster | Oct. 8, 1940 |
| 2,258,484 | Cory | Oct. 7, 1941 |
| 2,340,203 | Morse | Jan. 25, 1944 |
| 2,424,161 | Gunther | July 15, 1947 |
| 2,500,390 | Wales | Mar. 14, 1950 |